United States Patent

Livingston

[15] 3,679,763
[45] July 25, 1972

[54] PURIFICATION OF PROCESS GAS STREAMS BY HYDROGENATION

[72] Inventor: Jimmy Y. Livingston, Louisville, Ky.
[73] Assignee: Catalysts and Chemicals Inc., Louisville, Ky.
[22] Filed: July 28, 1970
[21] Appl. No.: 58,887

[52] U.S. Cl. .................................260/677 H, 260/681.5
[51] Int. Cl. .................................................C07c 5/02
[58] Field of Search ........................................260/677 H

[56] References Cited

UNITED STATES PATENTS

| | | | |
|---|---|---|---|
| 3,003,008 | 10/1961 | Fleming et al. | 260/677 H |
| 3,471,583 | 10/1969 | Fleming | 260/677 H |
| 3,420,618 | 1/1969 | Fleming | 260/677 H |
| 3,373,219 | 3/1968 | Krönig | 260/681.5 |

*Primary Examiner*—Delbert E. Gantz
*Assistant Examiner*—Veronica O'Keefe
*Attorney*—Norman L. Wilson, Jr.

[57] ABSTRACT

Process gases, for example, those gases derived from the pyrolysis or cracking of butane, kerosene, naphtha, refinery gases and other mineral oil and gas oil fractions, are excellent sources of olefins for the plastics industry. The acetylenes must of course be removed from these process gases before they are usable as raw materials for plastics. Hydrogenation is the process of choice, and a selective catalyst must be used so that acetylenes will be hydrogenated to the exclusion of the olefin. Partially sulfided catalysts afford a high degree of selectivity in hydrogenating acetylenes to the exclusion of olefins, but there is no selectivity between acetylenes and dienes, dienes being desired products. Accordingly the $C_4$ stream is generally removed prior to the selective hydrogenation reaction. Butylene, butadiene, propylene, and ethylene are removed herein from a process gas stream also containing acetylene and methylacetylene and propadiene by hydrogenating the acetylenes with minimal hydrogenation of butylene, butadiene, propylene, and ethylene. The process gas stream is passed through a bed of a catalyst so that the acetylenes are incompletely hydrogenated, the butadiene thus remaining unsaturated. Subsequently the gas stream is separated into $C_2$, $C_3$, and $C_4$ fractions, and then the $C_2$, $C_3$, and $C_4$ fractions are conducted to separate hydrogenation zones.

5 Claims, 1 Drawing Figure

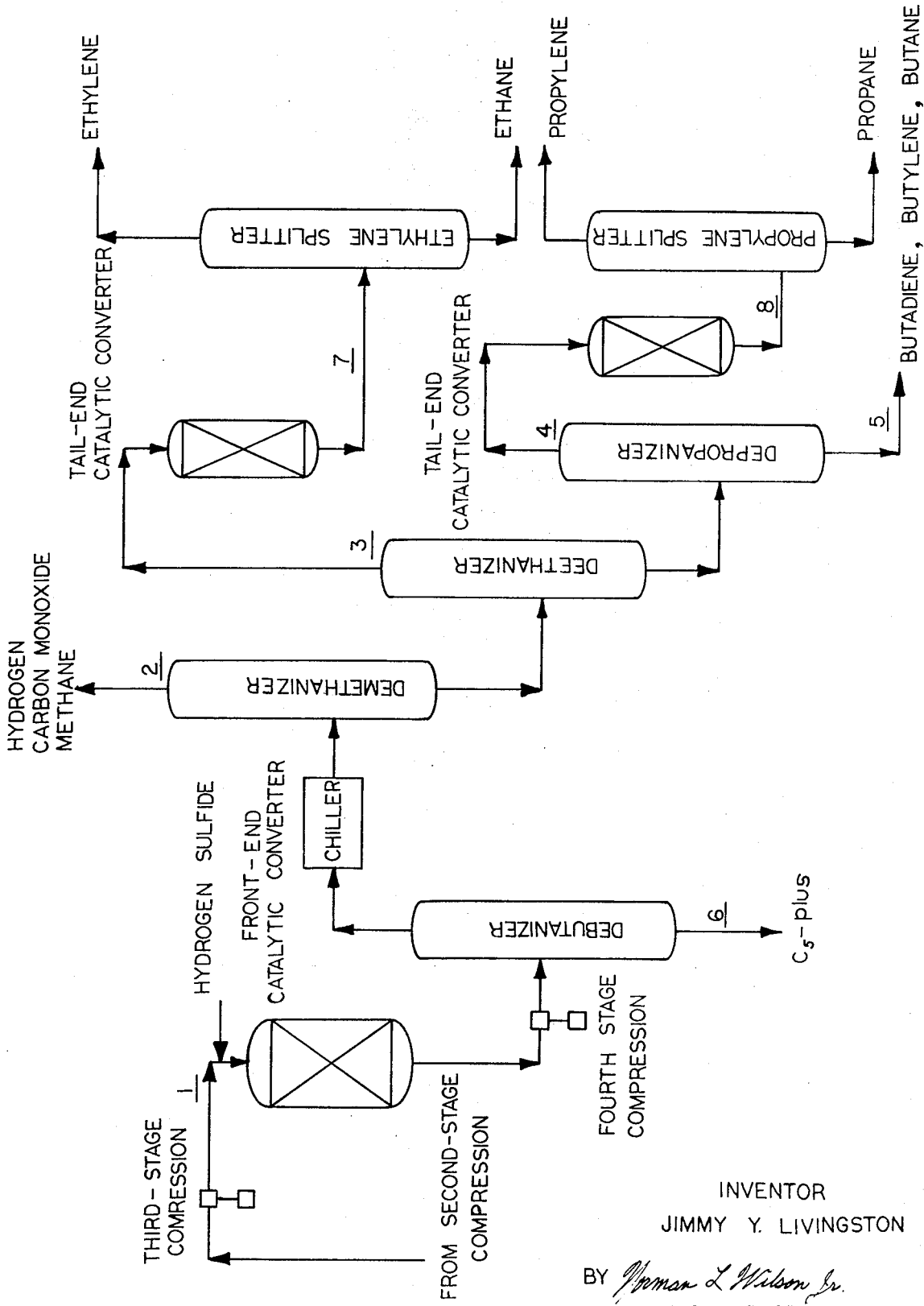

PURIFICATION OF PROCESS GAS STREAMS BY HYDROGENATION

BACKGROUND OF THE INVENTION

This invention relates to the purification by selective hydrogenation of hydrocarbon streams containing highly unsaturated compounds.

In one of the common methods for manufacturing olefins a hydrocarbon mixture such as refinery gas, naphtha, kerosene, or gas oil is passed through a reactor heated sufficiently to decompose the mixture with the formation of hydrogen and one or more unsaturated compounds. Pyrolysis processes of this type have been carried out at temperatures ranging from about 500° C. to about 1,200° C. with the yield of olefinic products per pass-through the reactor being highest at temperatures above 600° C. The olefin-containing mixtures obtained in such processes, generally known as process gases, usually contain a variety of other hydrocarbons along with the olefins. As an example, cracked butanes, cracked gas oil or refinery gas, all of which are well known sources of olefins, usually contain paraffinic hydrocarbons ranging from methane to hexane, olefins such as ethylene, propylene, butylene, amylene and hexenes, diolefins such as propadiene, 1,3 butadiene, 1,2 butadiene, and small quantities of acetylenic hydrocarbons such as acetylene, methylacetylene, and the like. The yield of acetylenic by-products becomes appreciable when operating at pyrolysis temperatures above 600° C., i.e., within the temperature range at which the olefins are usually produced in maximum yield.

Normally acetylenes can be readily hydrogenated, acetylene to form ethylene, or ethane, methylacetylene to form propylene or propane, etc. However, when olefins are present, the hydrogenation process is much more difficult to carry out. Selective hydrogenation poses a difficult problem when small amounts of acetylenic compounds are present in an olefin gas mixture. Thus, gas mixtures consisting essentially of ethylene for commercial uses such as high polymeric plastics should contain no more than about 10 parts per million (ppm) acetylenic impurities such as acetylene and methylacetylene. For the production of polyethylene, an ethylene stream is frequently demanded containing less than 5 ppm, and in some instances less than 1 ppm acetylene. Such being the case, virtually all of the acetylenes must be hydrogenated, preferably to olefins, without hydrogenation of olefins occurring also. However, as pointed out in U.S. Pat. No. 2,511,453, if it is desired to remove all but a trace of the acetylene originally present, a comparatively active catalyst must be used, with the result that the olefin content of the gas is appreciably reduced. If, in order to avoid this loss of olefin, a less active catalyst is employed, then a high degree of acetylene removal cannot be achieved.

In U.S. Pat. No. 2,511,453 it was shown that a catalyst is available having a high degree of selectivity for the hydrogenation of acetylenes in the presence of lower olefins. This selectivity is accomplished through the use of a partially sulfided, reduced nickel oxide catalyst, "partially sulfided" designating catalysts containing 2 to 50 atom equivalents sulfur per 100 atom equivalents nickel.

Most process gas streams contain a $C_4$ component. Among the hydrocarbons in a $C_4$ stream are butylene and butadiene, both of which are desired materials. One of the disadvantages of the sulfided nickel catalysts is that whereas they selectively hydrogenate acetylenes to the exclusion of olefins, there is no selectivity between acetylenes and dienes. Butadiene is therefore hydrogenated along with the acetylenic compounds and propadiene.

In order to recover ethylene from a process gas stream two general types of processing systems are used, one known as a "front-end" process, the other as a "tail-end" process. In the front-end process, a full-range stream containing both light and heavy components ranging from hydrogen up to $C_5$'s and heavier is processed over a fixed bed of selective hydrogenation catalyst, the partially sulfided nickel catalyst being preferred. This catalyst is operated to effect complete removal of simple acetylene and removal of a majority of the methylacetylene and propadiene. However about one-half of the butadiene is also hydrogenated. In the tail-end process, the full-range stream is first fractionated; then the acetylenes are removed from the individual concentrated streams by reacting these alkynes with hydrogen over selective hydrogenation catalysts.

Partially sulfided, reduced nickel oxide catalysts normally do not perform well in tail-end processes where less hydrogen is present. Hence they are used in front-end processes. However since these catalysts also promote the hydrogenation of butadiene, they cannot be used when butadiene is required unless the $C_4$ stream is first removed. In such instances a depropanizer is generally employed.

It is to be understood that regardless of the process used, there is a limit to the concentration of acetylene that can be processed by normal means. This is due to the fact that hydrogenation of acetylene is an exothermic reaction resulting in a temperature rise across the catalyst bed. With high levels of acetylene, say over 1 percent, the temperature reaches a level where the catalyst is non-selective and loss of product occurs. Under such conditions one of several methods is generally employed. The product stream can be recycled; the acetylene can be hydrogenated incrementally in a series of reactors with cooling stages between them; or olefin streams containing more than 1 percent acetylene can be hydrogenated using isothermal reactors.

SUMMARY OF THE INVENTION

In accordance with the practice of this invention a process is employed for hydrogenating acetylenes in process gas streams without first removing the $C_4$ stream. In addition the process permits the removal of acetylene by hydrogenation when more than 1 percent is present in the process gas stream without isothermal operation or the use of recycle. This invention therefore provides a process for the removal of butylene, butadiene, propylene, and ethylene from a process gas stream also containing acetylene and methylacetylene and propadiene by hydrogenating the acetylenes with minimal hydrogenation of butylene, butadiene, propylene, and ethylene. By the process of this invention the process gas stream is passed through a bed of a low surface area, partially sulfided, selective hydrogenation catalyst containing nickel, cobalt, and chromium. The partially sulfided catalyst is treated with an additional quantity of sulfur, that is 15 to 1,500 ppm by volume of a gaseous sulfur compound, so that the acetylenes are incompletely hydrogenated, the butadiene thus remaining unsaturated. Subsequently the gas stream is separated into $C_2$, $C_3$, and $C_4$ fractions, and then the $C_2$, $C_3$, and $C_4$ fractions are conducted to separate hydrogenation zones.

DETAILED DESCRIPTION OF THE INVENTION

It is normal practice when using partially sulfided, reduced nickel oxide catalysts to incorporate in the process gas feed stream a small quantity of a gaseous sulfur compound such as hydrogen sulfide, carbonyl sulfide or a gaseous mercaptan. The quantity, as sulfur, used varies from 1 to 10 ppm. This invention is based on the discovery that if the quantity of gaseous sulfur compound in the process gas stream exceeds 10 ppm, say 15 to 1,500 ppm based on sulfur, the selectivity of the partially sulfided, reduced nickel oxide catalyst is improved relative to butadiene. With this improvement it is possible to hydrogenate acetylene without hydrogenating butadiene if acetylene is not completely hydrogenated, for instance if 0.01 to 0.1 volume percent acetylene remains in the stream. This amount of acetylene can then subsequently be completely hydrogenated by the process of the invention.

The partially sulfided, reduced nickel oxide catalyst employed in the first hydrogenation reactor, termed front-end converter, should have a low surface area. The low surface area not only enhances the desired selectivity, but permits the addition of less sulfur, generally as a gas such as hydrogen sulfide. A low surface area is best obtained by the use of a carrier, heat treated to reduce its surface area to below 5 square meters per gram. Preferred carriers to be so-treated are the usual alumina and silica-alumina catalyst bases. Such bases are well known and need not be discussed at length herein. Desirable carriers to be heat treated are disclosed in U.S. Pat. No. 3,155,739. The catalyst is then formulated to deposit on the carrier 0.5 to 2.0 weight percent nickel, 0.1 to 0.4 weight percent cobalt, 0.02 to 0.1 weight percent chromium, and 0.5 to 1.0 weight percent sulfur, these percentages being based on the total catalyst. A desirable catalyst is one having 1 weight percent nickel, 0.1 weight percent chromium, 0.4 weight percent cobalt and 1 weight percent sulfur deposited on a silica-alumina carrier having a surface area less than 5 square meters per gram. The preparation of this and other catalysts employed in this process will be obvious to those skilled in the art.

A quantity of catalyst was prepared in accordance with the above description by immersing in an aqueous impregnating solution a suitable catalyst carrier, desirably a mixture of about 50 percent alumina and about 50 percent silica in the form of a ⅛-inch diameter sphere previously heated to a temperature above about 2,000° F. to lower its surface area below 5 square meters per gram. The impregnating solution was prepared by dissolving metallic nickel and cobalt in an aqueous nitric acid solution to which chromic acid anhydride had been added. A molecular equivalent (based on metal content) of sulfuric acid was added and the spheres immersed, drained, dried and calcined at a temperature of about 800° F. for about 12 hours.

Catalysts containing various concentrations of catalytic metals were prepared as above and were evaluated by loading them into an isothermal reactor and after reducing them with hydrogen at 700° to 900° F. passing various gaseous mixtures over the catalysts at a variety of pressures, temperatures and space velocities to measure the relative hydrogenation rates with various concentrations of sulfur in the feed gas.

EXAMPLE A

A catalyst was prepared by the above procedure such that it contained the following concentrations of catalytic metals, expressed as the pure metal: 2.5 weight percent nickel; 0.05 weight percent cobalt; 0.01 weight percent chromium and 1.1 weight percent sulfur. This catalyst was loaded into an isothermal reactor and after reduction with hydrogen a process gas of the following composition was passed over the catalyst at selected condition: 11.4 volume percent hydrogen, 0.2 volume percent acetylene, 29.8 volume percent ethylene, 10.7 volume percent propylene, 1.3 volume percent butadiene, 2.9 volume percent butylene and 43.7 volume percent nitrogen. One run was made with the above feed gas, as is, and a second run was made with the above feed gas to which 1 to 2 ppm by volume of a gaseous sulfur compound was added. Results of this test are shown in Table I.

EXAMPLE B

A second test was made with a catalyst equivalent to that described in Example A and was used to isothermally process a similar gas but which contained 0.7 volume percent acetylene, and 0.25 volume percent butadiene to which 370 ppmv of a gaseous sulfur compound had been added. Results of this test are shown in Table I.

EXAMPLE C

A third test was performed using another similar feed gas containing 0.5 volume percent acetylene and 1.0 volume percent butadiene and 750 ppmv of a sulfur compound, hydrogen sulfide, which was processed over a catalyst essentially the same as described in Example A, with the results also shown in Table I.

TABLE I

| Example | S in feed, p.p.m.v. | Pressure, p.s.i.g. | Temp., °F. | S.V., hrs.$^{-1}$ | Exit $C_2H_2$, p.p.m.v. | $C_4H_6$ loss, percent volume |
|---|---|---|---|---|---|---|
| A | 0 | 90 | 215 | 1,500 | 31 | 57.5 |
|   | 1–2 | 90 | 215 | 1,500 | 200 | 22.4 |
| B | 370 | 350 | 450 | 2,000 | 12 | 68.0 |
|   | 370 | 350 | 420 | 2,700 | 580 | 0 |
| C | 750 | 175 | 510 | 1,000 | 100 | 40.0 |

The tests reported in Table I show that only very small concentrations of sulfur in the feed gas have a very significant effect on the degree of acetylene removal. They also show that with properly selected operating conditions and feed sulfur concentrations, catalyst selectivity can be adjusted such that no measurable hydrogenation of butadiene will occur even at activity levels that remove better than 90 volume percent of the acetylene. This discovery is the basis of the invention.

Performance required of the catalysts for subsequently purifying the concentrated $C_2$, $C_3$, and $C_4$ streams, termed tail-end catalysts, is no different from that currently practiced and any one of several commercially available catalysts could be used. However, in the detailed discussion of the invention we relate preferable compositions of these catalysts.

The process of this invention can perhaps best be understood by reference to the process illustrated in the attached schematic drawing, which is illustrative only since various pieces of equipment such as pumps, valves, and the like have been omitted, as will be apparent, and some commercial processes may vary somewhat from that shown. However the relative positions of the catalytic converters generally are shown.

The FIGURE shows a flow diagram of a preferred embodiment of the invention with numerals being used to identify the various gas streams.

Referring to the FIGURE, a process gas mixture, stream 1, such as the stream resulting from the pyrolysis of a naphtha feedstock, having previously been treated for the removal of an aqueous phase, a liquid hydrocarbon phase, and scrubbed free of acid gases, is conducted through compression stages to bring the pressure to that desired for hydrogenation of the acetylenic compounds. The pressure maintained by the third stage compressor shown in the FIGURE is generally 200 to 500 psig, although pressures of 50 to 1,000 psig can be employed. These same pressures are attained by the fourth stage of compression, such being the system pressure.

The pyrolysis gas feed stream contains predominantly olefins and generally 10 to 30 volume percent hydrogen. Specifically, in addition to desired unsaturates such as ethylene, propylene, butylene, and butadiene to be recovered, the feed gas stream contains acetylene, methylacetylene, and sometimes vinylacetylene, as well as propadiene, and frequently isoprene and ethylacetylene. Since process gas stream 1 has not been previously fractionated, the stream also contains a large excess of hydrogen relative to the acetylenes and propadiene which are to be hydrogenated. The hydrogenation process accordingly must be one by which the undesirable alkynes and dienes are hydrogenated without also hydrogenating ethylene, propylene, butylene, and butadiene. In the front-end catalytic converter therefore a catalyst must be employed which promotes the hydrogenation of acetylene not only without hydrogenating ethylene and propylene, but without hydrogenating butadiene. As indicated hereinbefore, when a gaseous sulfur compound is added to the stream, the partially sulfided, reduced nickel oxide catalyst has a selectivity such that it performs this function. Hence as shown in the drawing, hydrogen sulfide is introduced into the front-end converter, the quantity being the afore-mentioned 15 to 1,500 ppm based on the precess gas stream.

The third stage of compression partially accomplishes the heating of the process gas stream to temperature conditions employed in the front-end catalytic converter with the remainder supplied from an external source, such as a steam preheater. The process gas stream and hydrogen sulfide are conveyed to the top of the front-end converter and passed downwardly through the catalyst bed at a temperature of 250° to 600° F., desirably 350° to 550° F. Space velocities employed in the front-end converter are in the range of 3,000 to 5,000, depending on system pressure, and desirably 4,000 volumes of gas per volume of catalyst per hour (VVH) at pressures above 150 psig.

In the front-end converter the partially sulfided nickel catalyst makes it possible to reduce the acetylene value to a low level without hydrogenating the butadiene. The resulting gas from the front-end converter flows to the fourth stage of compression and after additional processing such as drying and cooling is then conveyed to a debutanizer. In the debutanizer a separation is made between $C_5$'s and a butane and a lighter gaseous fraction. The $C_5$ fraction is removed as stream 6. The overhead stream containing $C_1$ through $C_4$ components is further cooled and then introduced to a demethanizer. In this fractionation column the $C_2$, $C_3$, and $C_4$ components are separated from an overhead stream 2 containing hydrogen, carbon monoxide, and methane. The $C_2$–$C_4$ stream is further fractionated in a deethanizer and a depropanizer as shown in the drawing so that separate $C_2$, $C_3$, and $C_4$ fractions can be withdrawn as streams 3, 4, and 5, respectively, and can be further hydrogenated as illustrated.

The $C_2$ fraction, stream 3, is admitted to the tail-end catalytic converter where the remaining acetylene is selectively hydrogenated so that only an ethylene-ethane stream remains, to be separated in the ethylene splitter. The $C_2$ tail-end converter is operated at a temperature of 90° to 400° F., usually 100° to 250° F., and hydrogen is added (not shown). The quantity of hydrogen added is equal to 1 to 2½ times the stoichiometric amount required to hydrogenate the acetylene in the stream to ethylene. The ethylene-hydrogen stream is passed through the catalyst bed at space velocities of 1,000 to 5,000 VVH, preferably 4,000 at typical system pressures of 300 to 400 psig.

Obviously a selective hydrogenation catalyst must be used in $C_2$ tail-end converter so that little or no ethylene is hydrogenated. A desirable catalyst can be made by the process described in U.S. Pat. No. 3,471,583. Briefly the catalyst is made by impregnating active alumina with a sufficient quantity of a heat decomposable nickel salt to form 1 to 5 percent nickel-alumina spinel, and heating the impregnated alumina to a spinelization reaction temperature of 1,800° to 2,400° F. with oxygen available. This heat treatment decomposes the nickel salt, and with oxygen present, forms 1 to 5 percent nickel-alumina spinel throughout the alumina by the end of the heat treatment. The nickel spinel-modified alumina is then impregnated with 0.01 to 5 percent, preferably 0.01 to 1, of a heat decomposable palladium salt. The resulting composition is then calcined (800° to 1,000° F.) to form a palladium hydrogenation catalyst. Thus the aluminum oxide matrix is modified by nickel alumina spinelization so that the nickel alumina spinel structure constitutes 1 to 5 percent, preferably 3 percent, by weight of the alumina spinel matrix and its surface area is reduced to 25 to 100 square meters per gram. More than 5 percent spinel can be used in the modification; however, no advantages are achieved thereby. For example, a large modification of, say 5.0 percent, is no better than a slight modification of 1 percent.

As can be seen from the drawing, a purified $C_2$ fraction has now been obtained without significantly hydrogenating ethylene and butadiene. Similarly the $C_3$ effluent, stream 4, from the depropanizer is selectively hydro-treated with 1 to 2½ times the stoichiometric amount of hydrogen required to hydrogenate methylacetylene and propadiene to propylene so that a pure propylene stream can be withdrawn from the top of the propylene splitter. The required hydrogen is admitted with the process gas to the inlet of the $C_3$ tail-end catalytic converter and passed through the catalyst bed at 100° to 700° F., desirably 150° to 350° F. The stream is processed through the $C_3$ tail-end converter at a somewhat lower space velocity of 1,000 to 4,000, generally 2,000 VVH at typical system pressures of 250 to 350 psig.

The catalyst employed in the $C_3$ tail-end converter is a high surface area palladium-on-alumina selective hydrogenation catalyst. Such catalysts can be made by U.S. Pat. No. 3,420,618. The alumina support acting as a carrier for palladium in the catalysts employed herein is activated alumina; that is, aluminum oxide which has been calcined or otherwise heated with steam or air, etc., to raise its surface area to above 100 square meters per gram, preferably in the range of 100 to 450 square meters per gram. The amount of palladium used is 0.01 to 5 weight percent based on the total weight of catalyst, preferably 0.01 to 1.

At this point we have obtained purified $C_2$ and $C_3$ fractions still without excessive loss of ethylene, propylene and butadiene. Simultaneously with separation and purification of the $C_2$ and $C_3$ fractions in those plants employing recovery of butadiene the $C_4$ fraction is further fractionated into concentrated butylene and butadiene fractions and the butadiene fraction is purified by the addition of an appropriate amount of hydrogen and processing it over a selective hydrogenation catalyst, usually a noble metal such as platinum or palladium on a specially prepared support material usually all or predominately alumina. In this purification step, impurities such as ethylacetylene and vinylacetylene are removed with only minor losses of butadiene.

It can be seen that by the process herein ethylene, propylene, butylene, and butadiene streams can be obtained without isothermal operation, without recycle of process gases, and without first fractionating the process feed gas stream 1. The advantages will be even more evident from a consideration of a commercial application. Specific data resulting from the treatment of an effluent gas stream from high-severity pyrolysis of a liquid feedstock is shown in Table II, III, and IV which follow. In these table front-end purifica-

TABLE II.—STREAM COMPOSITIONS, FRONT-END PURIFICATION

| Component | (1) Third stage compression gas Lb.-mol./hr. | Percent mol. | (2) Demethanizer overhead Lb.-mol./hr. | Percent mol. | (3) Deethanizer overhead Lb.-mol./hr. | Percent mol. | (4) Depropanizer overhead Lb.-mol./hr. | Percent mol. | (5) Depropanizer bottoms Lb.-mol./hr. | Percent mol. | (8) $C_3$ splitter feed Lb.-mol./hr. | Percent mol. |
|---|---|---|---|---|---|---|---|---|---|---|---|---|
| Hydrogen | 1,327.59 | 13.82 | 1,327.59 | 13.82 | | | | | | | | |
| Carbon monoxide | 6.72 | 0.07 | 6.72 | 0.07 | | | | | | | | |
| Methane | 660.91 | 6.88 | 660.91 | 6.88 | | | | | | | | |
| Acetylene | 107.59 | 1.12 | | | 0.04 | (a) | | | | | | |
| Ethylene | 4,005.84 | 41.70 | | | 3,885.66 | 74.48 | | | | | | |
| Ethane | 1,103.77 | 11.49 | | | 1,331.50 | 25.52 | | | | | | |
| M-Acetylene | 57.64 | 0.60 | | | | | 0.17 | (b) | | | 0.01 | (c) |
| Propadiene | 28.82 | 0.30 | | | | | 1.02 | 0.05 | | | | (d) |
| Propylene | 1,891.48 | 19.69 | | | | | 1,919.90 | 87.97 | | | 1,920.29 | 87.98 |
| Propane | 204.61 | 2.13 | | | | | 261.46 | 11.98 | | | 262.25 | 12.02 |
| Butadiene | 115.28 | 1.20 | | | | | | | 31.01 | 19.56 | | |
| Butylene | 22.09 | 0.23 | | | | | | | 64.23 | 40.52 | | |
| Butane | 21.13 | 0.22 | | | | | | | 63.26 | 39.91 | | |
| $C_5$'s | 11.53 | 0.12 | | | | | | | | | | |
| $C_6$'s | 25.94 | 0.27 | | | | | | | | | | |
| $C_7$'s | 7.69 | 0.08 | | | | | | | | | | |
| $C_8$'s | 0.96 | 0.01 | | | | | | | | | | |
| $C_{10}$'s | 6.72 | 0.07 | | | | | | | | | | |
| Total dry gas | 9,606.31 | 100.00 | 1,995.22 | 100.00 | 5,217.20 | 100.00 | 2,182.55 | 100.00 | 158.50 | 100.00 | 2,182.55 | 100.00 |
| Pressure, p.s.i.a. | 200 | | 325 | | 300 | | 250 | | 250 | | 350 | | a Less than 8 p.p.m. (mold).  b Less than 80 p.p.m. (mol.).  c Less than 1 p.p.m. (mol.).  d Less than 5 p.p.m. (mol.).

tion (Table II) and tail-end purification (Table III) are compared with the process of the invention (Table IV).

In Table II are listed compositions of various streams numbered as in FIG. 1 showing the effects of using only a front-end catalyst to obtain less than 10 ppm (mol) acetylene in the final ethylene product. This process requires a guard tail-end reactor on the $C_3$ fraction if a high purity propylene product is to be obtained. The primary disadvantages of this process are the high ethylene and butadiene losses, and the larger volumes of catalysts that are required.

In Table III are listed compositions of the various streams using tail-end processing only to obtain both high-purity ethylene and propylene with the impurities reduced to the same level as in Table II. This process eliminates loss of butadiene but results in significant ethylene and propylene losses, especially in those plants employing high-severity pyrolysis processes, due to the high level of impurity in the feed plus the need to operate the unit within very close limits to avoid high temperatures in the catalyst bed which produce undesired side reactions.

It is obvious that this invention applies to process gas streams which not only contain ethylene and propylene but butylene and butadiene as well. When only ethylene and propylene are present in the gas stream, conventional front-end or tail-end purification processes can be used except in the case of high-severity pyrolysis. Excessive losses of ethylene and propylene could occur as a result of high levels of impurities causing the catalyst beds to reach non-selective conditions. Also, heretofore when butylene and butadiene have also been present it has been necessary to remove this $C_4$ stream prior to hydrogenation when it was desirable to use front-end hydrogenation. Table II illustrates the effect of the front-end purification system on the process gas stream when the $C_4$ stream is not removed. The acetylene was reduced from 107.59 pound mols per hour to 0.04 and methylacetylene and propadiene was reduced from 57.64 and 28.82 pound mols per hour to 0.17 and 1.02 pound mols per hour, respectively. However, at the same time, butadiene was hydrogenated so that its concentration dropped from 115.28 pound mols per hour to 31.01, a loss of 73 percent. As can be seen from Table

TABLE III.—STREAM COMPOSITIONS, TAIL-END PURIFICATION

| Component | (1) Third stage compression gas Lb.-mol./hr. | Percent mol. | (3) Deethanizer overhead Lb.-mol./hr. | Percent mol. | (4) Depropanizer overhead Lb.-mol./hr. | Percent mol. | (5) Depropanizer bottoms Lb.-mol./hr. | Percent mol. | (7) $C_2$ splitter feed Lb.-mol./hr. | Percent mol. | (8) $C_3$ splitter feed Lb.-mol./hr. | Percent mol. |
|---|---|---|---|---|---|---|---|---|---|---|---|---|
| Hydrogen | 1,327.59 | 13.82 | | | | | | | | | | |
| Carbon monoxide | 6.72 | 0.07 | | | | | | | | | | |
| Methane | 660.91 | 6.88 | | | | | | | | | | |
| Acetylene | 107.59 | 1.12 | 107.59 | 2.06 | | | | | 0.04 | (a) | | |
| Ethylene | 4,005.84 | 41.70 | 4,005.84 | 76.78 | | | | | 3,925.72 | 75.25 | | |
| Ethane | 1,103.77 | 11.49 | 1,103.77 | 21.16 | | | | | 1,291.44 | 24.75 | | |
| M-Acetylene | 57.64 | 0.60 | | | 57.64 | 2.64 | | | | | | (b) |
| Propadiene | 28.82 | 0.30 | | | 28.82 | 1.32 | | | | | 0.01 | (c) |
| Propylene | 1,891.48 | 19.69 | | | 1,891.48 | 86.67 | | | | | 1,920.29 | 87.98 |
| Propane | 204.61 | 2.13 | | | 204.61 | 9.37 | | | | | 262.25 | 12.02 |
| Butadiene | 115.28 | 1.20 | | | | | 115.28 | 72.73 | | | | |
| Butylene | 22.09 | 0.23 | | | | | 22.09 | 13.94 | | | | |
| Butane | 21.13 | 0.22 | | | | | 21.13 | 13.33 | | | | |
| $C_5$'s | 11.53 | 0.12 | | | | | | | | | | |
| $C_6$'s | 25.94 | 0.27 | | | | | | | | | | |
| $C_7$'s | 7.69 | 0.08 | | | | | | | | | | |
| $C_8$'s | 0.96 | 0.01 | | | | | | | | | | |
| $C_{10}$'s | 6.72 | 0.07 | | | | | | | | | | |
| Total dry gas | 9,606.31 | 100.00 | 5,217.20 | 100.00 | 2,182.55 | 100.00 | 158.50 | 100.00 | 5,217.20 | 100.00 | 2,182.55 | 100.00 |
| Pressure, p.s.i.a. | 200 | | 325 | | 300 | | 250 | | 250 | | 350 | | a Less than 8 p.p.m. (mol.).
b Less than 1 p.p.m. (mol.).
c Less than 5 p.p.m. (mol.).

Table IV shows the stream compositions that result from the use of the process of the invention. This process requires less total catalyst, smaller or fewer reactors, and offers greater operational flexibility, plus significant savings from reduced losses of ethylene, propylene and butadiene through undesired non-selective hydrogenation.

II both butylene and butane increased but the value of those products are considerably less than that of butadiene. To avoid this loss of valuable product it is customary to use a front-end depropanizer and pass only the $C_3$ and lighter fraction over the front-end hydrogenation catalyst. This greatly adds to the cost of the plant because the pyrolysis product

TABLE IV.—STREAM COMPOSITIONS, INVENTION PROCESS

| Component | (1) Third stage compression gas Lb.-mol./hr. | Percent mol. | (3) Deethanizer overhead Lb.-mol./hr. | Percent mol. | (4) Depropanizer overhead Lb.-mol./hr. | Percent mol. | (5) Depropanizer bottoms Lb.-mol./hr. | Percent mol. | (7) $C_2$ fractionator feed Lb.-mol./hr. | Percent mol. | (8) $C_3$ fractionator feed Lb.-mol./hr. | Percent mol. |
|---|---|---|---|---|---|---|---|---|---|---|---|---|
| Hydrogen | 1,327.59 | 13.82 | | | | | | | | | | |
| Carbon monoxide | 6.72 | 0.07 | | | | | | | | | | |
| Methane | 660.91 | 6.88 | | | | | | | | | | |
| Acetylene | 107.59 | 1.12 | 6.80 | 0.13 | | | | | 0.04 | (a) | | |
| Ethylene | 4,005.84 | 41.70 | 4,005.84 | 76.78 | | | | | 3,985.81 | 76.40 | | |
| Ethane | 1,103.77 | 11.49 | 1,204.56 | 23.09 | | | | | 1,231.35 | 23.60 | | |
| M-acetylene | 57.64 | 0.60 | | | 11.53 | 0.53 | | | | | | (b) |
| Propadiene | 28.82 | 0.30 | | | 12.02 | 0.55 | | | | | 0.01 | (c) |
| Propylene | 1,891.48 | 19.69 | | | 1,929.23 | 88.39 | | | | | 1,943.36 | 89.04 |
| Propane | 204.61 | 2.13 | | | 229.77 | 10.53 | | | | | 239.18 | 10.96 |
| Butadiene | 115.28 | 1.20 | | | | | 115.28 | 72.73 | | | | |
| Butylene | 22.09 | 0.23 | | | | | 22.09 | 13.94 | | | | |
| Butane | 21.13 | 0.22 | | | | | 21.13 | 13.33 | | | | |
| $C_5$'s | 11.53 | 0.12 | | | | | | | | | | |
| $C_6$'s | 25.94 | 0.27 | | | | | | | | | | |
| $C_7$'s | 7.69 | 0.08 | | | | | | | | | | |
| $C_8$'s | 0.96 | 0.01 | | | | | | | | | | |
| $C_{10}$'s | 6.72 | 0.07 | | | | | | | | | | |
| Total dry gas | 9,606.31 | 100.00 | 5,217.20 | 100.00 | 2,182.55 | 100.00 | 158.50 | 100.00 | 5,217.20 | 100.00 | 2,182.55 | 100.00 |
| Pressure, p.s.i.a. | 200 | | 325 | | 300 | | 250 | | 250 | | 350 | | a Less than 8 p.p.m. mol.
b Less than 1 p.p.m. mol.
c Less than 5 p.p.m. mol.

must be refrigerated and reheated when a front-end depropanizer is used.

The tail-end purification process was developed and is used as an improvement over the front-end process in that butadiene is conserved and the need for reheating the entire gaseous pyrolysis product after refrigeration is eliminated. However, the operational flexibility of commercial catalysts used in tail-end purification is limited and the high levels of impurities resulting from high-severity pyrolysis exceeds the limits of good operation with these catalysts.

The highly exothermic hydrogenation reaction raises the temperature of the tail-end catalysts above the limits of selective hydrogenation of product olefins, i.e., ethylene and propylene. Because this process requires that hydrogen be added to the feed streams, operation at conditions of poor selectivity results in excessive hydrogen usage which is a valuable by-product. It also results in erratic performance in that if too much hydrogen is consumed in the hydrogenation of ethylene and propylene, there is an insufficiency of hydrogen for hydrogenation of acetylene or methylacetylene and propadiene, permitting high levels of impurities to remain in the product.

As shown in Table IV the process of this invention eliminates or minimizes the problems associated with either the front-end or tail-end purification processes in that it permits use of a front-end catalyst to partially remove undesirable impurities but at conditions that conserve butadiene to an extent that need for a front-end depropanizer, with its attendant higher capital and operating costs, is eliminated. By partially removing impurities over the front-end catalyst, their concentration in the feed streams to the tail-end converters are reduced to a level that is well within established limits of good operation.

Also, by having to remove only a portion of the impurities, less catalyst of each type is required than if either front-end or tail-end processing were used alone. For example, the volumes of catalyst, in cubic feet, shown in Table V would be typical for current commercial practice with the streams given in Tables II, III, and IV.

TABLE V

| Feed Stream | Front-End | Process Tail-End | Invention |
|---|---|---|---|
| (1) | 2900 | — — | 1825 |
| (3) | — — | 1450 | 480 |
| (4) | 415 | 1240 | 550 |

The front-end process requires a total of three reactors, two for the front-end catalyst and one for the $C_3$ fraction guard unit. The tail-end process requires a total of six reactors, three each for the $C_2$ and $C_3$ fractions. The process of the invention requires a total of four reactors, two for front-end catalyst and one each for the $C_2$ and $C_3$ fractions.

A comparison of total yields of the more valuable products from the selective hydrogenation of the same quantities of the feed as given in Tables II, III and IV, shown in Table VI, vividly illustrates the primary economic advantages offered by the process of the invention:

TABLE VI

| Product Million lbs/Yr | Front-End | Process Tail-End | Invention |
|---|---|---|---|
| Ethylene | 861.7 | 870.6 | 883.9 |
| Propylene | 638.8 | 638.8 | 646.4 |
| Butylenes | 28.5 | 9.8 | 9.8 |
| Butadiene | 13.3 | 49.3 | 49.3 |

One acquainted with the value of these commodities can quite easily determine that the process of the invention permits recovery of additional product having an aggregate value that ranges from 0.45 to 3.5 million dollars per year depending on the process with which it is compared.

In summary, it can be said that the process of the invention permits the processing of pyrolysis products that heretofore was not possible without additional pre-processing of the hydrogenation unit feeds to avoid severe loss of valuable products; without significantly limiting the operational flexibility of the plant; or without special processing provisions that add to the cost of the operation. In addition, it permits increased recovery of valuable products that are lost by being non-selectively hydrogenated to less valuable components.

What is claimed is:

1. In the process for the recovery of butylene, butadiene, propylene, and ethylene from a process gas stream also containing acetylene, methylacetylene and propadiene wherein the acetylenes and propadiene are hydrogenated by passing the process gas stream at a temperature of 200° to 600° F. along with an excess of hydrogen beyond that required to hydrogenate acetylenes and propadiene in said stream through a bed of non-noble metal selective hydrogenation catalyst comprising about 0.1 to 5 percent by weight nickel, 0.05 to 0.5 percent by weight cobalt, and 0.01 to 0.1 percent by weight chromium and 0.1 to 1.0 percent by weight sulfur supported on an alumina or silica-alumina carrier, the improvement comprising adding to the process gas stream a sufficient quantity of a gaseous sulfur compound within the range of 15 to 1,500 parts per million based on sulfur so that over the catalyst, and under the hydrogenation conditions, 0.01 to 0.1 volume percent acetylenes remains in the gas stream due to incomplete hydrogenation of acetylenes, and effecting said hydrogenation under said conditions.

2. The process of claim 1 wherein the process gas stream passed through the initial selective hydrogenation catalyst bed contains more than 0.3 mol percent acetylene.

3. The process of claim 1 wherein the process gas stream passed through the initial selective hydrogenation catalyst bed contains 10 to 30 mol percent hydrogen.

4. The process of claim 1 wherein the process gas stream passed through the initial selective hydrogenation catalyst bed is a gaseous product of the pyrolysis of naptha or other liquid hydrocarbons.

5. The improvement of claim 1 wherein the process gas stream contains 0.50 to 1.5 volume percent acetylene, wherein following the partial hydrogenation thereof the stream is fractionated into $C_2$, $C_3$ and $C_4$ components, and wherein the remaining acetylene is hydrogenated at an elevated temperature in contact with a selective palladium hydrogenation catalyst.

* * * * *